(12) United States Patent
Jarrell

(10) Patent No.: US 10,327,434 B1
(45) Date of Patent: Jun. 25, 2019

(54) REMOTELY OPERABLE LATCH FOR A PULLEY-TYPE ENDLESS HALYARD

(71) Applicant: John L. Jarrell, Bolivar, MO (US)

(72) Inventor: John L. Jarrell, Bolivar, MO (US)

( * ) Notice: Subject to any disclaimer, the term of this patent is extended or adjusted under 35 U.S.C. 154(b) by 214 days.

(21) Appl. No.: 15/601,427

(22) Filed: May 22, 2017

Related U.S. Application Data

(60) Provisional application No. 62/339,456, filed on May 20, 2016.

(51) Int. Cl.
*A01K 91/08* (2006.01)

(52) U.S. Cl.
CPC .................... *A01K 91/08* (2013.01)

(58) Field of Classification Search
CPC ..................................... A01K 91/08
USPC ........................................... 43/27.2
See application file for complete search history.

(56) References Cited

U.S. PATENT DOCUMENTS

| | | | |
|---|---|---|---|
| 2,744,352 A | 5/1956 | Holgerson | 43/43.13 |
| 2,749,648 A * | 6/1956 | Schneider | A01K 91/08 43/17 |
| 3,023,532 A | 3/1962 | Gorenty | 43/17 |
| 3,040,690 A * | 6/1962 | Harless | B63H 9/08 114/108 |
| 3,358,399 A | 12/1967 | Waldmann | 43/4 |
| 3,462,870 A | 8/1969 | Terilli | 43/4 |
| 3,732,644 A | 5/1973 | Kavanagh | 43/22 |
| 3,899,846 A | 8/1975 | Sanchez | 43/25 |
| 3,987,746 A | 10/1976 | McCulloh | 114/235 R |
| 4,077,347 A * | 3/1978 | Arce | B63H 9/08 114/108 |
| 4,097,023 A | 6/1978 | Muller | 254/391 |
| 4,386,760 A | 6/1983 | Hutton | 254/371 |
| 4,533,026 A | 8/1985 | Bernard | 188/184 |
| 4,648,194 A | 3/1987 | Carroll, Jr. | 43/4.5 |
| 4,875,428 A * | 10/1989 | Schlesch | A01K 91/08 114/255 |

(Continued)

FOREIGN PATENT DOCUMENTS

| | | | |
|---|---|---|---|
| FR | 1262033 | 4/1960 | ........... A01K 89/033 |
| WO | WO-2011005172 A1 * | 1/2011 | ........... B66D 1/7426 |

OTHER PUBLICATIONS

"If It Doesn't Have a Bill—It's Just a Bait." Decker. M., *Big Game Fishing Magazine*, Mar./Apr. 2006. pp. 20-27.

*Primary Examiner* — Christopher P Ellis
(74) *Attorney, Agent, or Firm* — Jonathan A. Bay

(57) ABSTRACT

A remotely operable latch for a pulley-type endless halyard has a traveller, a tubular hollow dock for receiving and latching onto the traveller, a fishing-line release clip conjoined to the traveller, proximal pulley tackle mounted to a boat, distal pulley tackle conjoined with the dock and mounted to an outrigger spar, and an elongated halyard. The halyard has a distal end connected to the traveller, and a proximal end threaded through the dock, around the distal pulley, and then again around the proximal pulley, and connected to the fishing-line release clip. The traveller has a sidewall formed with a heart-shaped groove and the dock has an inside sidewall provided with an tone arm elongated between a pivotal base and a stylus for tracing the groove in the traveller, wherein the traveller latches in the dock when the stylus is caught in the cleavage of the heart-shaped groove.

18 Claims, 16 Drawing Sheets

(56) References Cited

U.S. PATENT DOCUMENTS

| | | | | |
|---|---|---|---|---|
| 4,887,542 | A | * 12/1989 | Piveteau | B63H 9/10 |
| | | | | 114/108 |
| D306,134 | S | 2/1990 | Harken et al. | D8/360 |
| 5,054,577 | A | 10/1991 | Petzl et al. | 182/5 |
| 5,096,022 | A | 3/1992 | Bowers | 188/65.1 |
| 5,170,581 | A | 12/1992 | Lyons | 43/43.12 |
| 5,197,223 | A | * 3/1993 | Spurgeon | A01K 91/08 |
| | | | | 43/43.12 |
| 5,233,781 | A | 8/1993 | Bigelow | 43/17 |
| 5,360,083 | A | 11/1994 | Hede | 182/5 |
| 5,577,576 | A | 11/1996 | Petzl et al. | 188/65.4 |
| 6,129,033 | A | * 10/2000 | Jarrell | B63B 21/04 |
| | | | | 114/199 |
| 8,109,034 | B1 | 2/2012 | McCauley | 43/27.2 |
| 8,656,632 | B1 | * 2/2014 | Mercier | A01K 91/08 |
| | | | | 43/27.4 |
| 9,173,386 | B2 | 11/2015 | Karpanty | 43/27.4 |
| 2014/0041282 | A1 | * 2/2014 | Karpanty | A01K 91/053 |
| | | | | 43/27.4 |

* cited by examiner

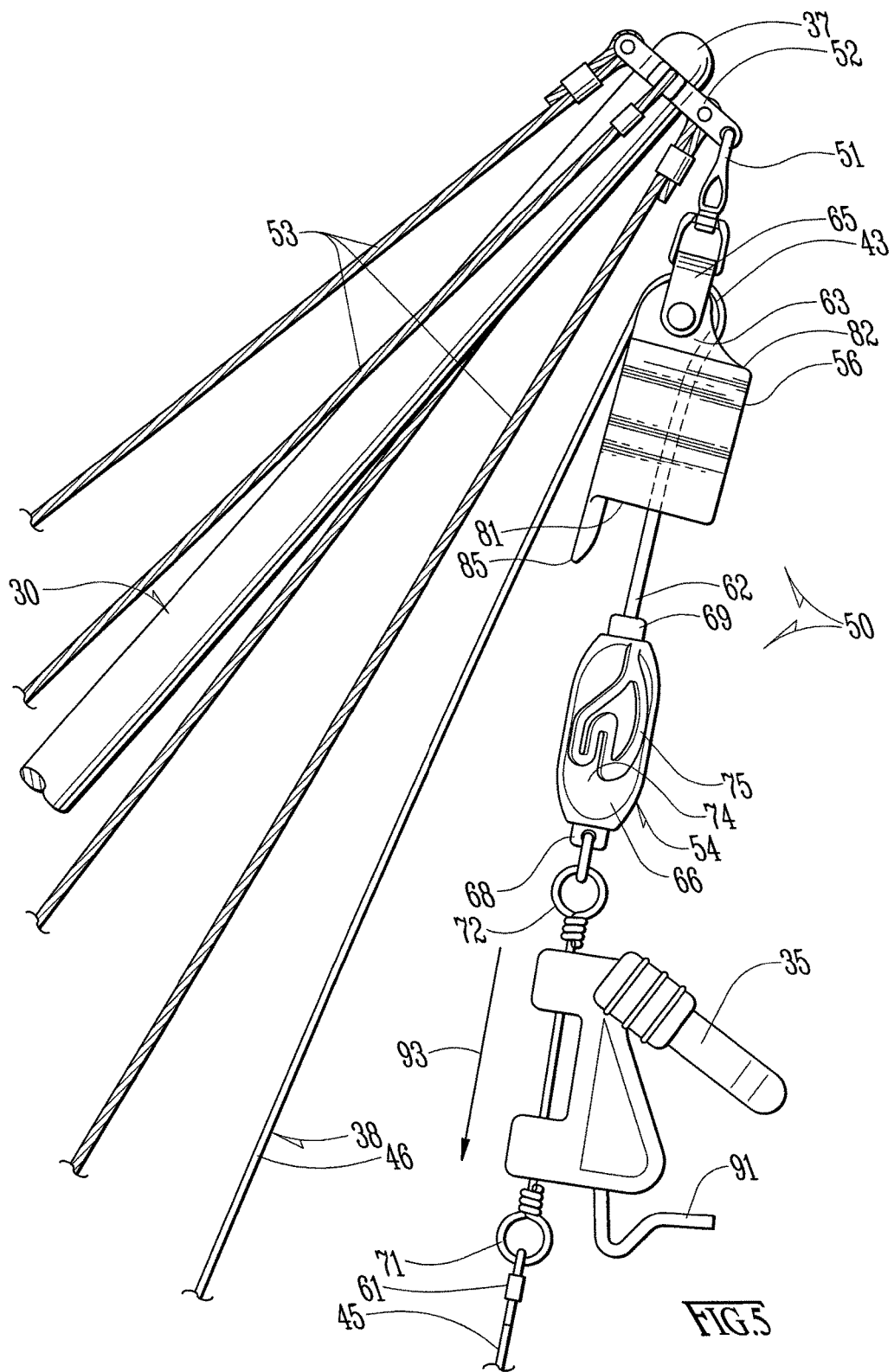

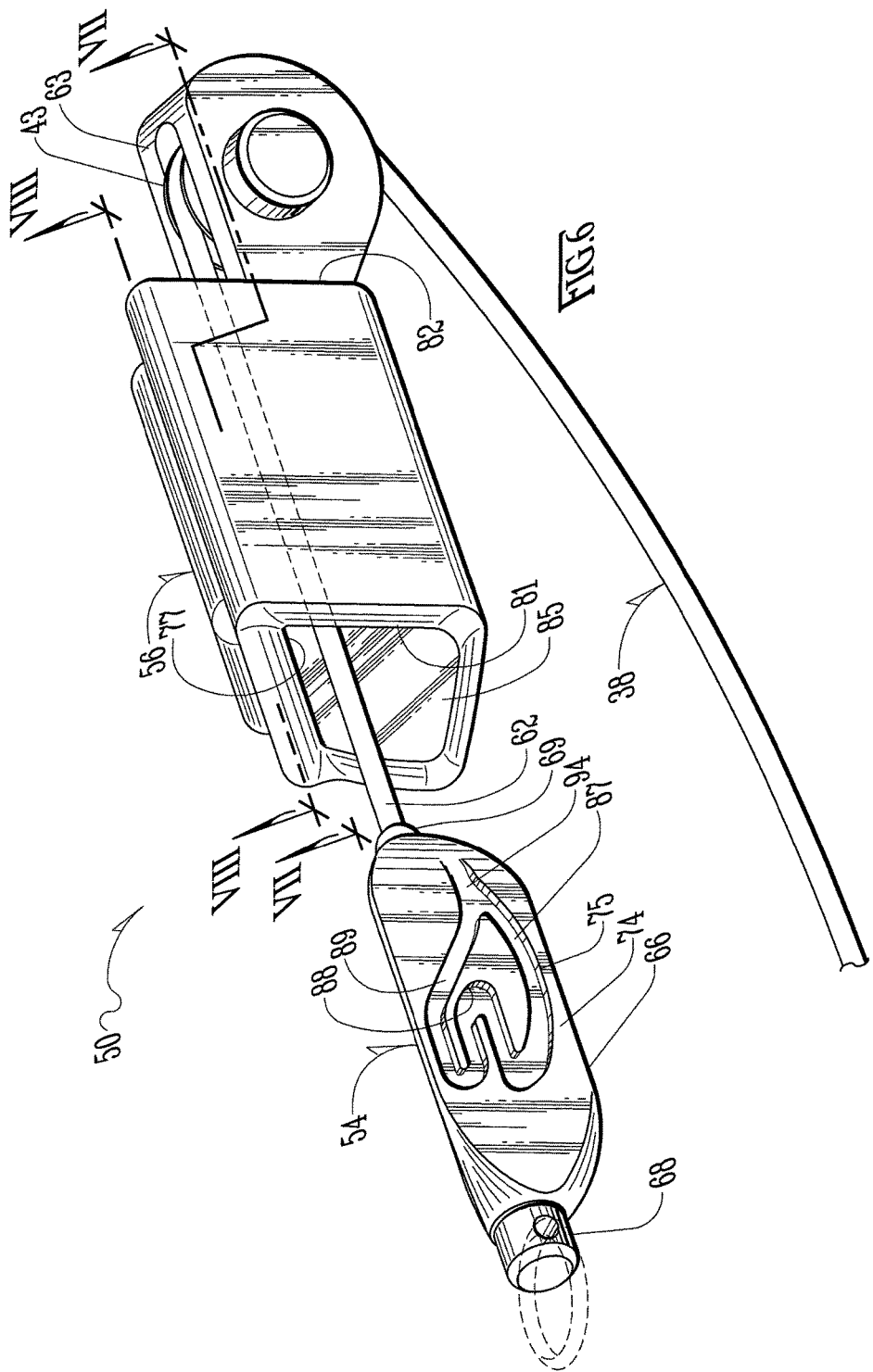

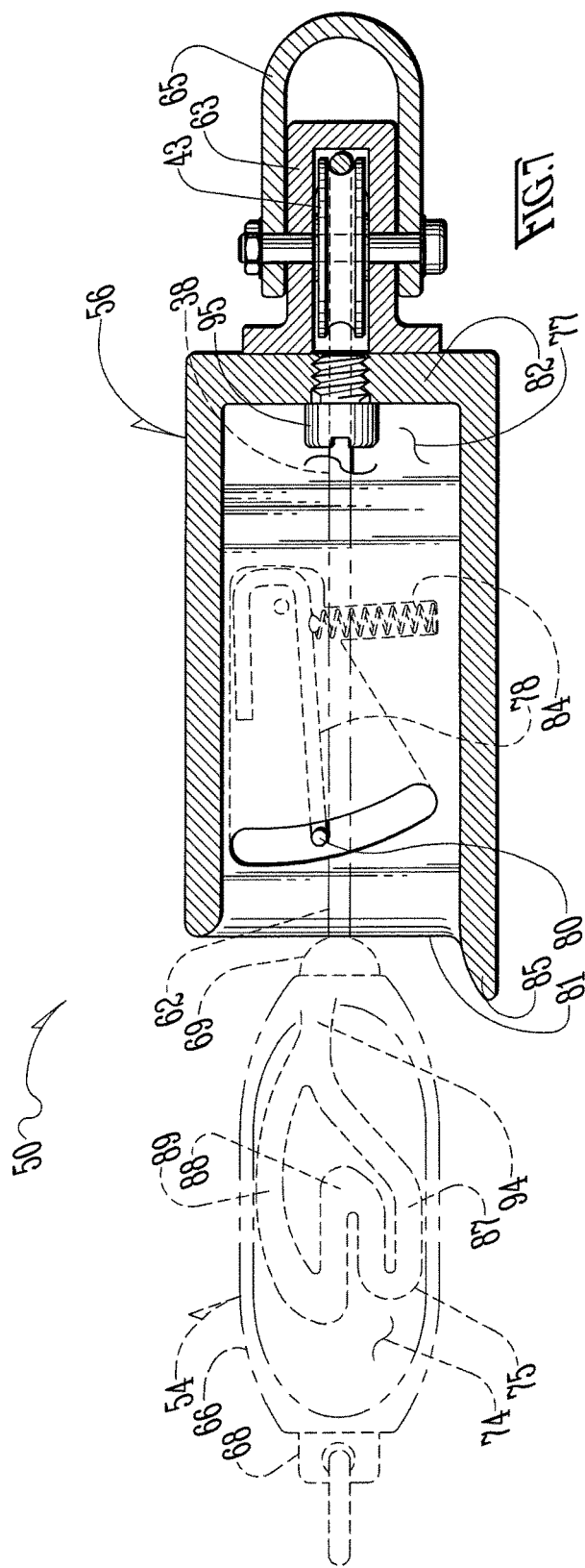

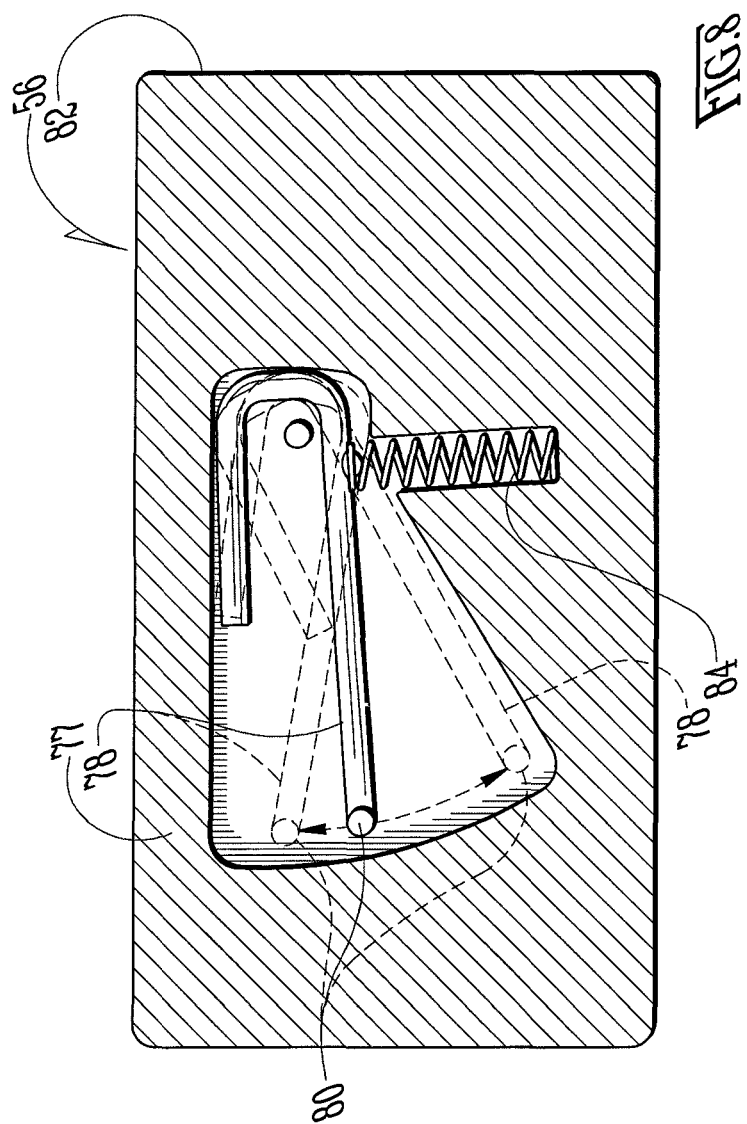

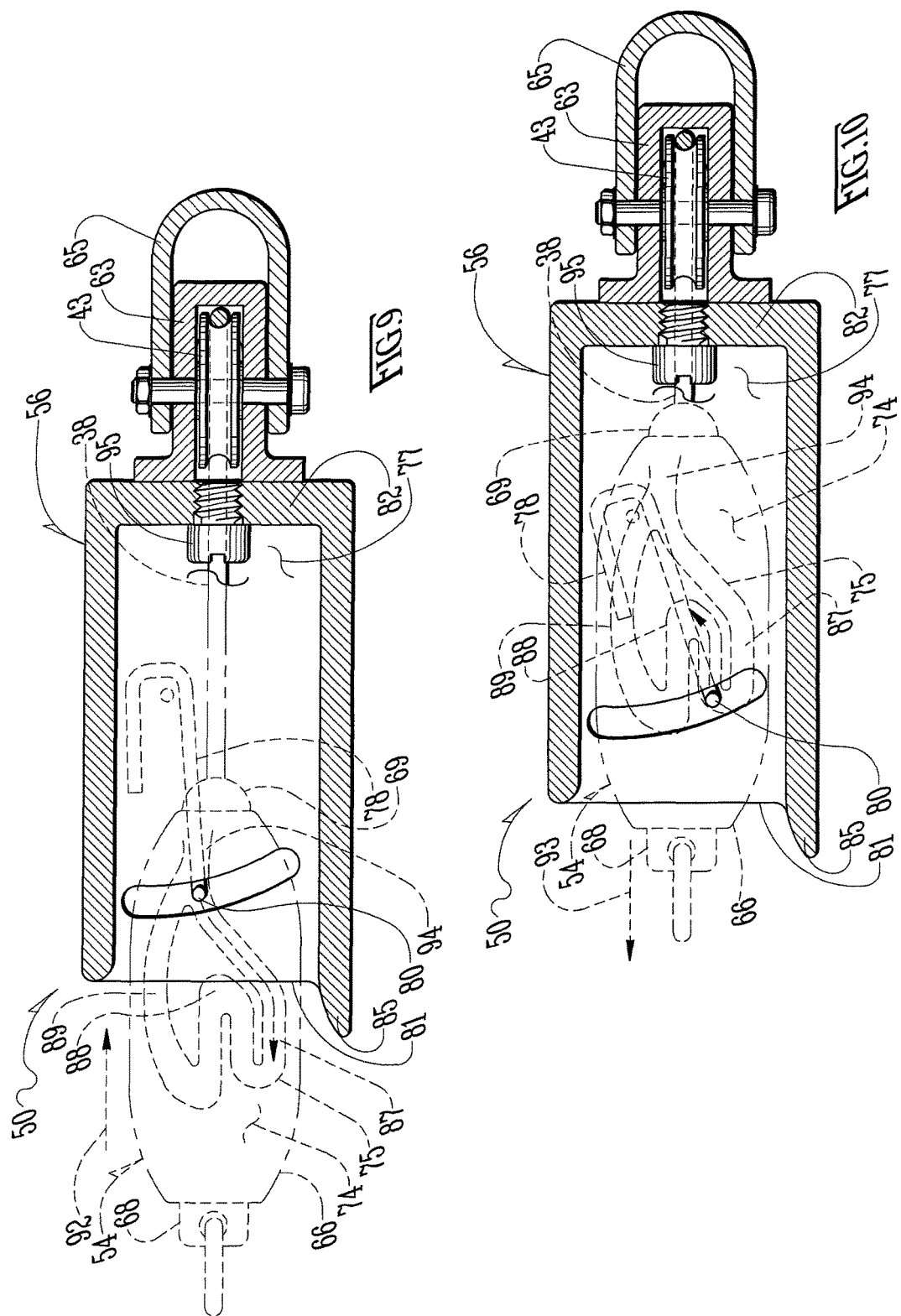

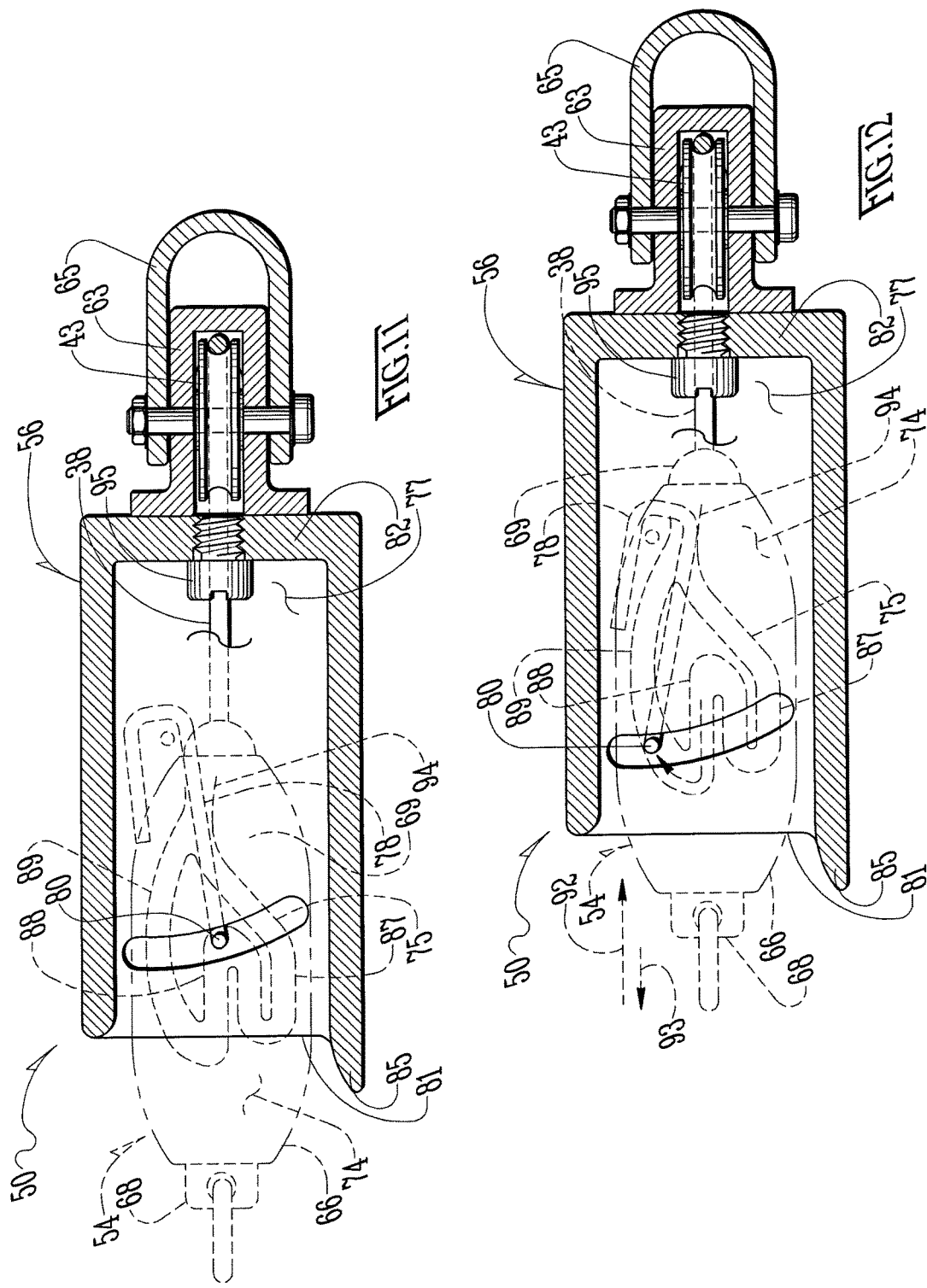

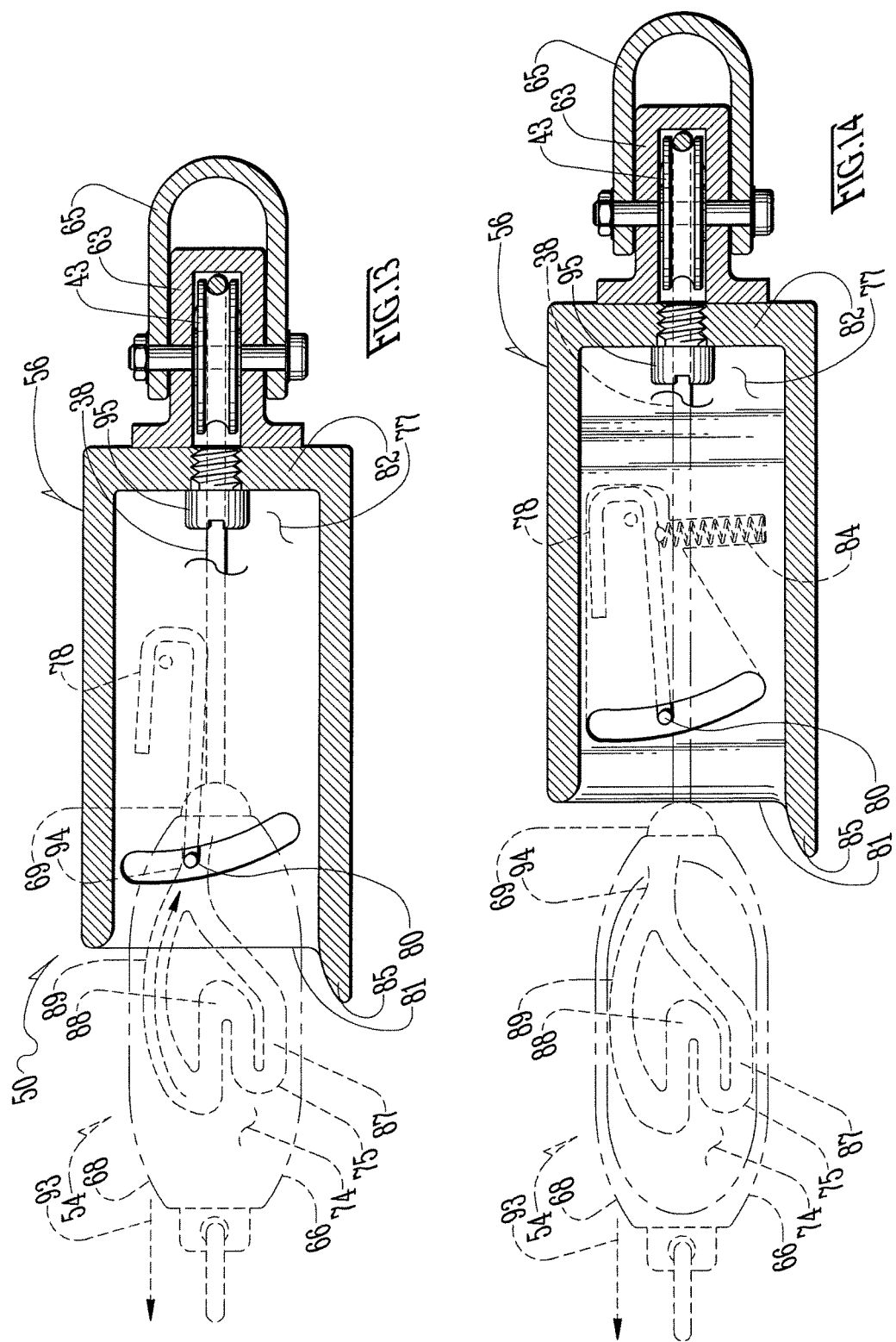

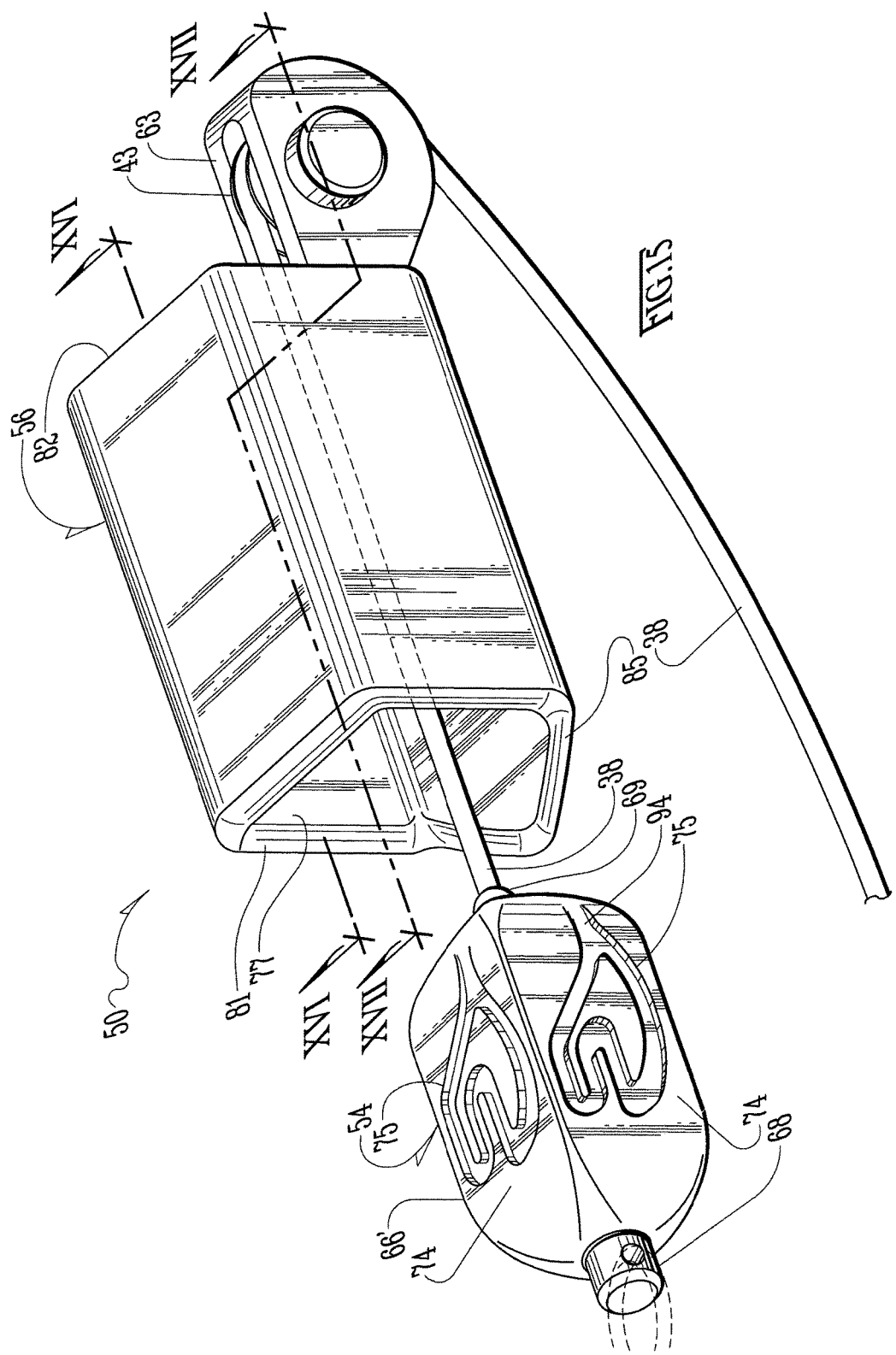

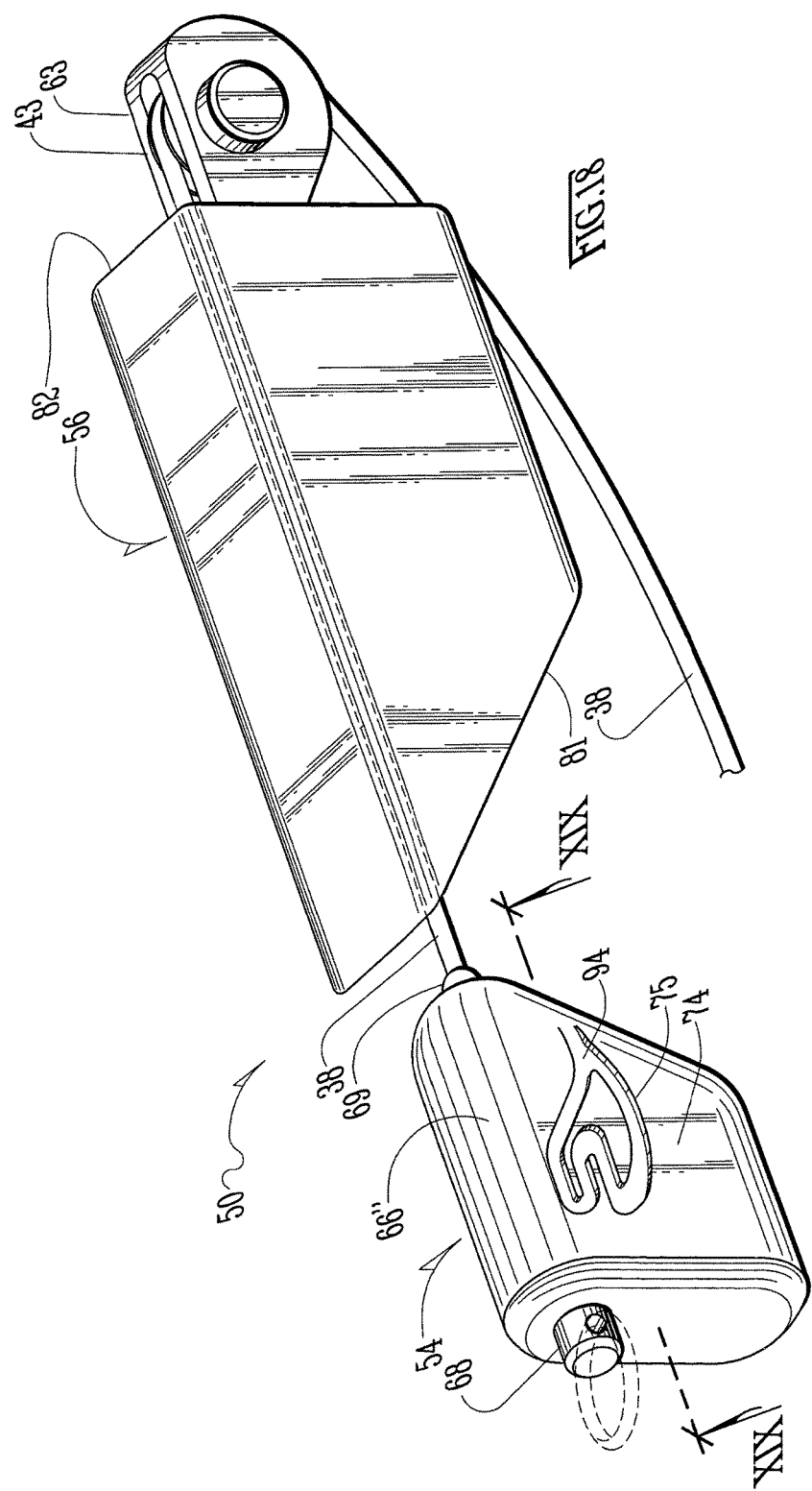

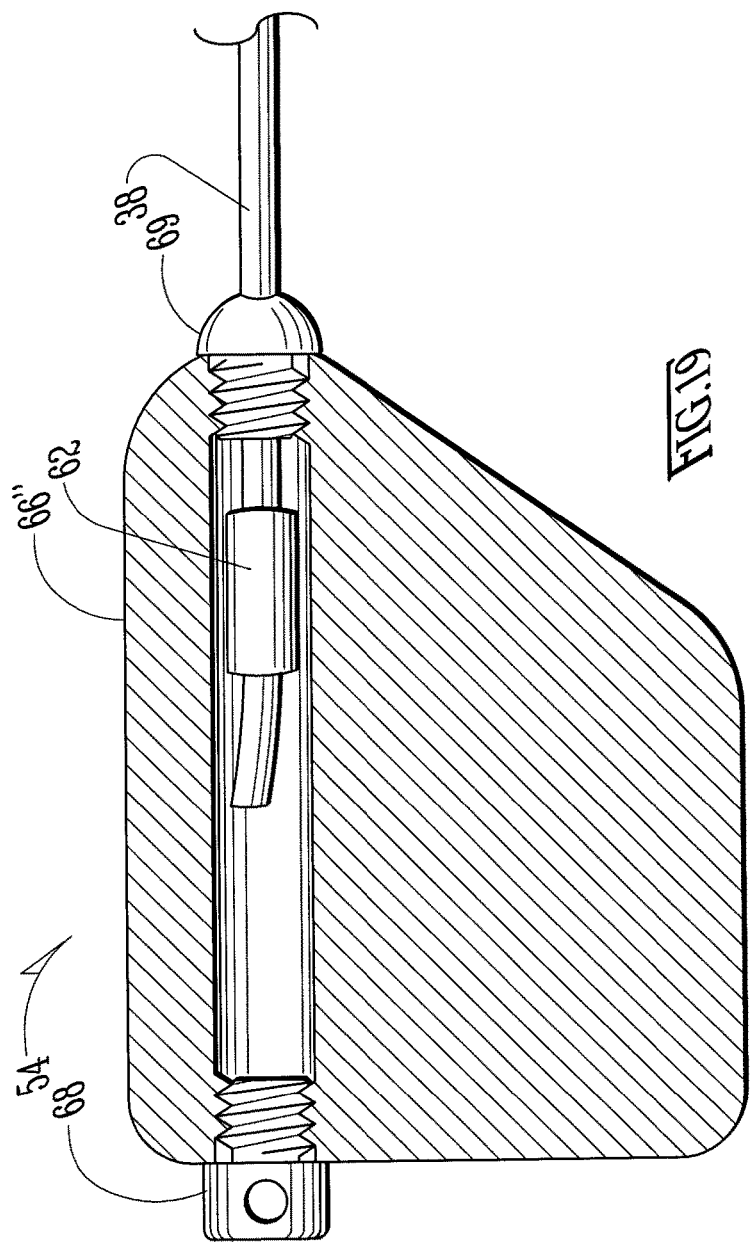

REMOTELY OPERABLE LATCH FOR A PULLEY-TYPE ENDLESS HALYARD

CROSS-REFERENCE TO PROVISIONAL APPLICATION(S)

This application claims the benefit of U.S. Provisional Application No. 62/339,456, filed May 20, 2016. The foregoing patent disclosure is incorporated herein by this reference thereto.

BACKGROUND AND SUMMARY OF THE INVENTION

The invention relates to outrigger equipment for anglers who typically troll with side-rigged outrigger spars and, more particularly, to a remotely operable latch for a pulley-type endless halyard for (1) not only carrying the fishing-line release clip from the boat's gunwale to the tip of the outrigger spar (2) but also for eliminating halyard creep of the fishing line release clip away from the outrigger spar tip when latched at the spar tip.

This patent application is commonly-invented by and commonly-owned with U.S. Pat. No. 6,129,033—Jarrell, issued Oct. 10, 2000, the disclosure of which is incorporated fully herein by this reference thereto.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 4 is a perspective view comparable to FIG. 3 except showing the fishing-line release clip sprung open and the fishing line long departed from the view, and further showing that the latch in accordance with the invention comprises a dock half hooked to the tip end of the outrigger spar and a traveller half that is shuttled back and forth from the dock at the tip end of the outrigger spar to the beam of the boat at the gunwale thereof by the endless halyard (eg., a line, a cord or a rope and the like), wherein FIG. 4 shows that the return run of the halyard has been tugged to pull the traveller into an extreme stop position in the dock (in the direction as indicated by an outboard-bound arrow 92) after which the traveller will be free to depart the dock (in the direction as indicated by an inboard-bound arrow 93) and return to the beam of the boat;

FIG. 5 is a perspective view comparable to FIG. 4 except showing the remotely operable latch in accordance with the invention unlatched, with the traveller half of the latch heading toward the beam of the vessel (in the direction as indicated by inboard-bound arrow 93) and dock half of the latch remaining hooked to the tip end of the outrigger spar;

FIG. 6 is an enlarged scale perspective view of the remotely operable latch in accordance with the invention and as shown in FIG. 5, with the traveller half shown free of the dock half;

FIG. 7 is a section view taken along line VII-VII in FIG. 6;

FIG. 8 is a section view taken along line in FIG. 6;

FIG. 9 is a section view comparable to FIG. 7 except showing the traveller half of the latch entering the dock half and wherein a stylus on a tone arm pivotally connected in the dock is shown in a neutral position therefor and entering an opening to an asymmetrical heart-shaped groove in a sidewall of the traveller;

FIG. 10 is a section view comparable to FIG. 9 except showing the traveller reaching its furthest extreme travel inside the dock, wherein the stylus has traced the groove around the relatively more diminutive lobe of the asymmetrical heart-shaped groove (albeit the loop around the relatively more diminutive lobe—the inbound loop—is the relatively longer loop);

FIG. 11 is a section view comparable to FIG. 10 except showing the traveller having sprung back away from the position shown in FIG. 10 to where the stylus is at rest in the cleavage of the asymmetrical heart-shaped groove, between the two lobes;

FIG. 12 is a section view comparable to FIG. 11 except showing that the initially pulling the return run of the halyard has consequentially pulled the traveller back toward the position shown in FIG. 10 in the direction of outboard-bound arrow 92, which in further consequence has sent the stylus tracing the outbound loop around the relatively larger lobe, which thereafter the traveller is free to depart the dock in the direction of inboard-bound arrow 93;

FIG. 13 is a section view comparable to FIG. 12 except showing the traveller in the stage of exiting the dock and wherein the stylus is about to be left behind by the traveller and pass through the single opening in the asymmetrical heart-shaped groove;

FIG. 14 is a section view comparable to FIG. 13 except showing that the traveller has departed from the dock, and the stylus has returned to the neutral position;

FIG. 15 is a perspective view comparable to FIG. 6 except showing an alternate polygonal geometry shared between the traveller and the dock to ensure that at least one flat sidewall of the traveller interacts with a coplanar inside sidewall of the dock that is furnished with the tone arm and stylus;

FIG. 18 is a perspective view comparable to FIGS. 6 and 15 except showing still another geometry shared between the traveller and the dock to ensure that at least one flat sidewall of the traveller interacts with a coplanar inside sidewall of the dock that is furnished with the tone arm and stylus; and FIG. 19 is a section view taken along line XIX-XIX in FIG. 18.

DETAILED DESCRIPTION OF THE PREFERRED EMBODIMENTS

Figure 1:
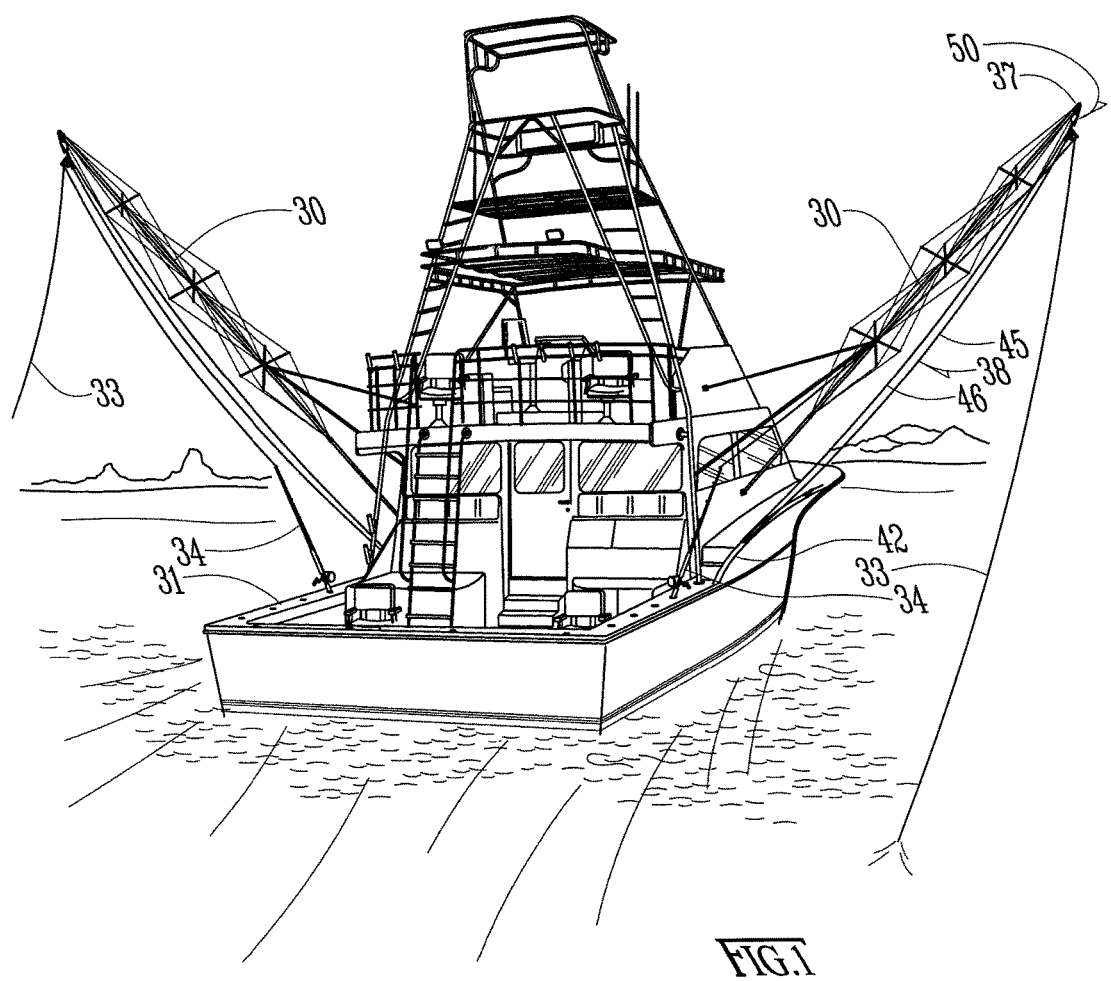
FIG. 1 is a perspective view of a sportfishing boat showing a pair of side-rigged outriggers equipped with a remotely operable latch in accordance with the invention for a pulley-type endless halyard (albeit to diminutive in the view to discern)
Figure 2:
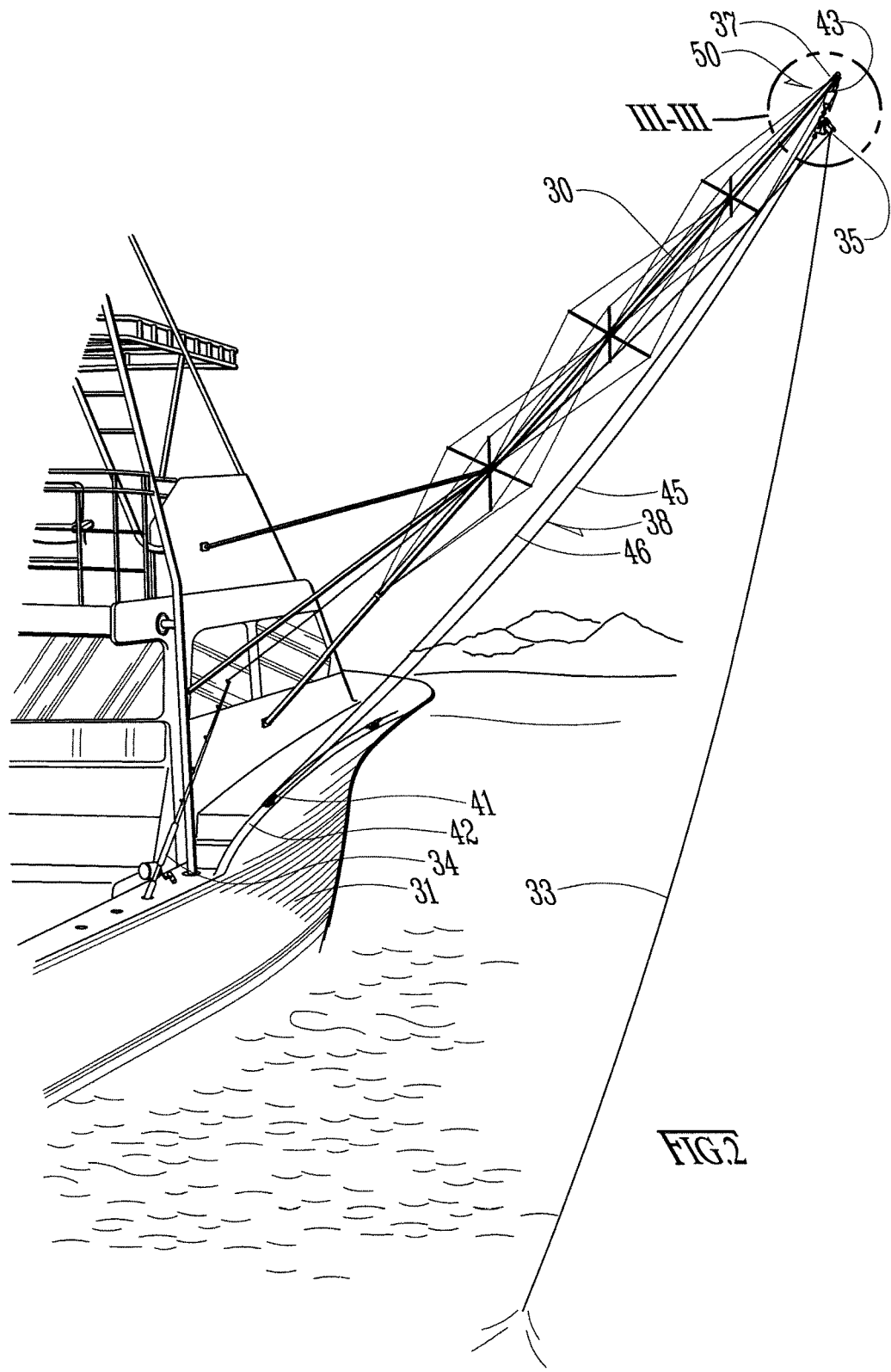
FIG. 2 is an enlarged scale perspective view of the starboard beam thereof and the starboard outrigger spar therefor.

FIGS. 1 and 2 show that the invention relates to outrigger equipment for anglers who typically troll with side-rigged outrigger spars 30 from fishing boats 31. Typically this kind of trolling is done on saltwater or large bodies of freshwater like the Great Lakes.

The fishing line 33 of a fishing rod 34 is carried by a fishing-line release clip 35 (see FIG. 3) to the tip end 37 of an outrigger spar 30 by an endless halyard 38. The halyard 38 is looped through a proximal pulley 41 at the beam 42 of the boat 31 and a distal pulley 43 (see FIG. 3) at the tip 37 of the spar 30. The halyard 38 has both a carrying run 45 for carrying the fishing-line release clip 35 back and forth between the beam 42 or gunwale of the boat 31 to a position near the tip 37 of the outrigger spar 30, and, a return run 46.

With reference to FIGS. 3-6, the latch 50 in accordance with invention is attached to a snaphook 51 that is attached to an eye in hardware like a collar 52 affixed to the near the tip end 37 of the outrigger spar 30. Presumably, the manual effort to rig the tip end 37 of the outrigger spar 30 with the collar 52, guy wires 53, the latch 50 and the halyard 38 would be done when the boat 31 is at dock 56 or else with spar 30 pulled out from its sockets or anchors therefor in or on the boat 31.

The outrigger spar 30 is preferably a flexible rod, typically of fiberglass or composite such that, in use, the outrigger spar 30 is flexed. The flexion not only puts tension on the halyard 38 but also provides shock-absorbing compensation to the rolling of the boat 31 in rolling seas.

FIGS. 5 and 6 show better that the latch 50 comprises two distinct and separable bodies, one being a traveller 54 and the other being a dock 56.

The pulley-type endless halyard 38 which comprises a line (eg., a strand or strands of some filament to make a rope or line) with a proximal tag end 61 attached to the fishing-line release clip 35 and a distal tag end 62 attached to the traveller 54. The fishing-line release clip 35 and traveller 54 are linked together. The halyard 38 forms an endless circuit and is stretched between the proximal pulley 41 at the beam 42 of the boat 31 the distal pulley 43 near the tip 37 of the outrigger spar 30. Hence, the halyard 38 is thus stretched, and, can be driven manually by hand like a pulley-type clothes line.

The distal or outboard pulley 43 is mounted in a block 63 that is attached or formed out of the distal end of the dock 56. This pulley block 63 is encompassed by a shackle 65 that has a D-ring coupled in the eye of a snaphook 51 that is in turn hooked to an eye in the collar 52 near the tip end 37 of the spar 30.

The proximal pulley 41 on the boat 31 would likely be mounted in similar tackle, except perhaps not solidly mounted to the boat 31, but tethered by a short lanyard of shock cord or the like (not shown). The proximal pulley 41 is mounted anywhere on the boat 31 where users inside the boat 31 can easily put hands on the endless halyard 38. That way, users can hand-line the halyard 38 to hoist the conjoined traveller 54 and fishing-line release clip 35 out to the dock 56, and hand-line the halyard 38 again to lower them back to the boat 31. The preference for making lanyard securing the proximal pulley tackle 41 a shock cord or the like is the same reason that it is a preference to make the outrigger spar 30 flexible—namely, to allow for compensation of a rolling boat 31 in rolling seas.

Given the foregoing, the pulley-type endless halyard 38 is generally arranged in a loop comprising a carrying run 45 and a return run 46. As referenced earlier, the remotely operable latch 50 in accordance with the invention comprises a pair of separable structures:—a dock half 56 and traveller half 54.

The traveller 54 has a body 66 that has a proximal end 68 and a distal end 69. The fishing-line release clip 35 also has proximal and distal ends 71 and 72. The distal end 69 of the traveller 54 is a fixture for the distal tag end 62 of the endless halyard 38. The proximal end 68 of the traveller 54 is attached to a distal end 72 of the fishing-line release clip 35. The proximal end 71 of the fishing-line release clip 35 is attached to the proximal tag end 61 of the halyard 38. The carrying run 45 of the halyard 38 comprises the tag ends 61 and 62 secured to the fishing-line release clip 35 and traveller 54, respectively, as well as those portions extending from the tag ends 61 and 62 between the proximal and distal pulleys 41 and 43. The portions of the halyard 38 traversing between the distal and proximal pulleys 41 and 43 spaced from and not attached to the traveller 54 or the fishing-line release clip 35 are sort of a backside of the halyard 38 and comprise the return run 46.

The dock 56 is the receiver for the traveller 54. In use, a user can manually hand-line the endless halyard 38 near the proximal pulley 41, but the portions of the endless halyard 38 near the distal pulley 43 and dock 56 are way too far out of reach of even the longest of arms. Or at least that is true for the typical trolling angler who wants wide coverage with side-rigged outriggers that extend way far away from the beam 42 of the boat 31.

It is an object of the invention to allow a user to manually hand-line (ie., pull or push) on the carrying or return runs 45 and 46 respectively of the endless halyard 38 in order to achieve the following:—

(1)—to engage—and latch—the traveller 54 in the dock 56, such that the latching action secures the traveller 54 in the dock 56 to combat halyard creep (backward travel of the traveller 54); and (2)—unlatch the traveller 54 from the dock 56 to allow the user to lower the traveller 54 back to the beam 42 of the boat 31, whereby fishing line 33 can be re-strung in the fishing-line release clip 35 (ie., the fishing line 33 being presumably released from the release clip 35 by a fish strike or otherwise).

In FIGS. 3-14, the traveller 54 is an elongated body 66, eg., a polyhedron which is triangular in cross-section, and has spherical or bulbous docking nose 69. The traveller 54 has three or more lateral flat outside walls 74, and each is recessed with an identical (or fairly identical) heart-shaped groove 75.

The traveller 54 is an elongated body 66, eg., a polyhedron, and has spherical or bulbous docking nose 69. The traveller 54 has lateral flat outside walls 74, and either at least one or else each is recessed with an identical (or fairly identical) heart-shaped groove 75.

The dock 56 is a hollow body that has an elongated socket for the traveller 54 to dock 56 thereinto. The socket has a counterpart cross-section, which provides for further generally flat lateral inside walls 77. All but one of these inside walls 77 are not necessarily equipped with any other meaningful or mechanical features. One such inside wall 77 is. It has an elongated tone arm 78 which is generally U-shaped and generally co-planar with the lateral flat face of the inside wall 77 of the socket of dock 56 in which the stylus 80 are installed. At the tip of the tone arm 78 there is an in-turned tracer stylus 80.

The dock 56 comprises a tubular hollow body extending between an enlarged open end 81 and a substantially closed end 82 with a hole allowing back and forth passage of the halyard 38. The enlarged open end 81 comprises a mouth facing the direction from which the traveller 54 enters the mouth 81 and departs the mouth 81. The distal end 69 of the traveller 54 comprises a bulbous nose 69 transitions away from there into a polyhedron or the like, or at least a shape which presents at least one flat sidewall 74.

FIG. 6 shows the body 66 of the traveller 54 having a triangular cross-section. FIG. 15 shows an alternative wherein, the body 66' of the traveller 54 has a square cross-section. FIG. 18 shows a further alternative wherein the body 66" of the traveller 54 has a somewhat rectangular cross-section except that the short sides are cylindrical.

In all versions, the dock 56 has a receiving cavity geometry that has at least planar inside sidewall 77 furnished with an elongated tone arm 78. The tone arm 78 has a base end which is loosely attached or pivoted near the substantially closed end 82 of the dock 56. The tone arm 78 extends to a turned-in tip end forming a stylus 80 for the tone, which is positioned near the mouth 81 of the dock 56. The tone arm 78 is furnished with some form of biasing to urge the stylus 80 in a neutral position as shown in FIG. 7. There, the biasing is provided by a coil spring 81 which acts to return the stylus 80 to return to the neutral position (eg., nine o'clock in that view) whenever deflected clockwise or counterclockwise away from that neutral position.

The biasing function can be performed by many alternative means including a torsion spring, a natural or synthetic resilient material, or by supporting the base end of the tone arm 78 cantilevered style such that the tone arm 78 is in fact the spring.

It is an aspect of the invention that geometry shared between the traveller 54 and the dock 56 ensure that at least one lateral flat sidewall 74 of the traveller 54 interacts with a coplanar lateral inside sidewall 77 of the dock 56 that is furnished with the tone arm 78 and stylus 80.

In FIGS. 3-17, every sidewall 74 of the traveller 54 is formed with the same asymmetrical heart-shaped groove 75, while only one inside sidewall 77 of the dock 56 is furnished with the tone arm 78 and stylus 80. In FIGS. 18 and 19, the traveller 54 is bottom heavy and should about always enter the dock 56 in the orientation as shown. Hence only the sidewall 74 shown is formed with the asymmetrical heart-shaped groove 75.

Referring to FIGS. 6, 7 and 9, the traveller 54 enters the mouth 81 of the dock 56 first by the bulbous nose end 69, and then spins as it traverses a cam projection 85 at the lip of the mouth 81 such that one lateral flat outside wall 74 of the traveller 54 is are co-planar with the lateral flat inside wall 77 of the dock 56 that is furnished with the tone arm 78 and stylus 80.

Again, it does not matter which lateral flat outside wall 74 of the traveller 54 engages with the stylus wall 77 of the dock 56. All lateral outside walls 74 of the traveller 54 in FIGS. 3-17 have about the same tracing groove 75 to present to the stylus wall 77 of the dock 56. The stylus 80 enters the opening channel 94 of the asymmetrical heart-shaped tracing groove 75 and travels all the way around the smaller of the two lobes, around the inbound loop 87 of the groove 75. After that, the tension on the halyard 38 from the flexed spar 30 and the shock cord on the proximal pulley 41 will pull on the traveller 54, trying to pull the traveller 54 out of the dock 56. But the stylus 80 will get caught in the cleavage 88 of the heart-shaped groove 75, and be pinned there between the two lobes. When the user pulls on the return run 46 of the halyard 38, the traveller 54 will be pulled further into the dock 56, letting the stylus 80 escape from the cleavage 88 and start a journey around the outbound loop 89 of the heart-shaped groove 75. While the stylus 80 is caught in the cleavage 88, there are multiple sources of tension on the halyard 38 tending to keep the stylus 80 caught in the cleavage 88. Besides the spar 30 and the shock that have already been mentioned, there is also the tension of the trolling bait (or lure). The pull of the fishing line 33 on the conjoined release clip 35 and traveller 54 will be inboard. Again, all these factors will hold the tracing stylus 80 in the cleavage 88 of the heart-shaped groove 75 until a user manually causes release by launching the stylus 80 to trace the outbound loop 89.

Whenever a user wants, he or she hand-lines the endless halyard 38 (by any of pulling the return run 46, pushing the carrying run 45, or do both together), and the stylus 80 will escape the cleavage 88 start tracing in the outbound loop 89 of the heart-shaped groove 75. Ultimately, as shown in FIGS. 13 and 14, the traveller 54 will depart the dock 56 completely, and can be brought back down from the tip end 37 of the spar 30 to the beam 42 of the boat 31.

The user is free to re-bait hook or change lures on the fishing line 33 held by the fishing-line release clip 35, then re-load the fishing line 33 in the release clip 35 and, by means of hand-lining the halyard 38, hoist the conjoined traveller 54 and release clip 35 back to near the tip end 37 of the outrigger spar 30. And so on, for innumerous times for users to get a lure or fresh bait back in the water for trolling, as towed from the outboard tow position of the release clip 35 near the tip end 37 of the outrigger spar 30.

What follows are more particular remarks for each of FIGS. 3 through 19.

Figure 3:
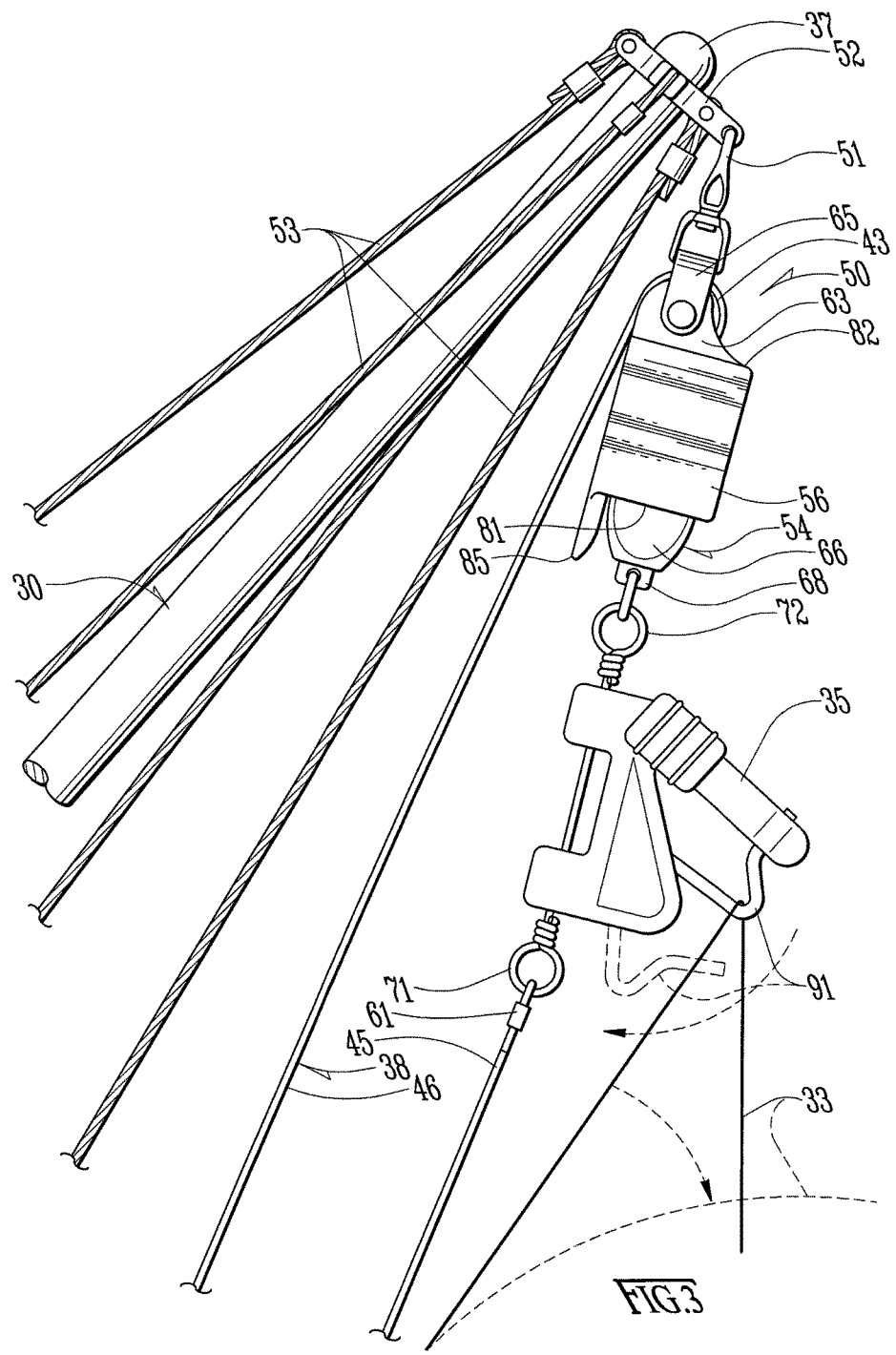
FIG. 3 is an enlarged scale perspective view of detail III-III in FIG. 2 showing the remotely operable latch in accordance with the invention, the tip end of the outrigger spar, the endless halyard, and fishing-line release clip.

FIG. 3 shows the release clip 35 and traveller 54 conjoined together, with the traveller 54 securely latched in the dock 56, and the dock 56 hooked or clipped securely to hardware attached on the end of the spar 30. The illustration of the release clip 35 in solid lines shows the bale 91 closed and the fishing line 33 trailing away from the tow point of the closed bale 91. The bale 91 of the release clip 35 is shown in dashed lines in a sprung open position, and the fishing line 33 is shown in dashed lines in the stages of quickly straightening out to be in direct extension from the user's fishing rod 34 and reel.

Figure 4:
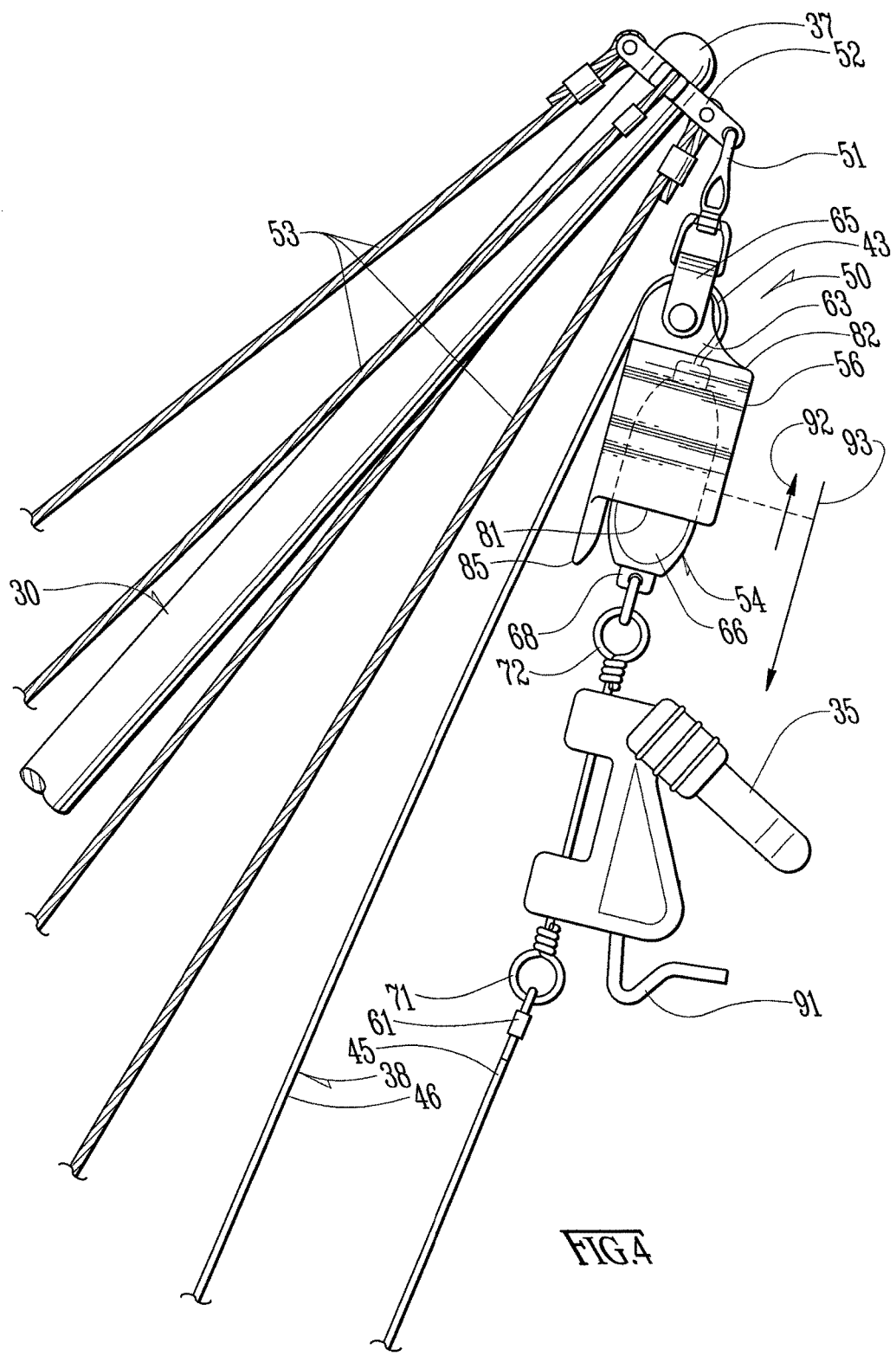

FIG. 4 shows the bale 91 of the fishing-line release clip 35 sprung open and the fishing line 33 long departed from the view. For the user to initiate retrieval of the conjoined release clip 35 and traveller 54, he or she then hand-lines halyard 38 to move the traveller 54 to an extreme outboard "stop" position in the dock 56 (in the direction as indicated by an outboard-bound arrow 92). After that, the traveller 54 will be free to depart the dock 56 (in the direction as indicated by an inboard-bound arrow 93) and wherein the user can quickly hand-line the halyard 38 and return the conjoined release clip 35 and traveller 54 to the beam 42 of the boat 31. And FIG. 5 shows exactly that situation in progress.

FIG. 5 is an enlarged scale perspective view of the traveller 54, the dock 56 and distal tag end 62 of the halyard 38. Pulling on the return run 46 of the halyard 38 will pull the traveller 54 into the mouth 81. The lip of the mouth 81 has a cam provision 85 for spinning the entering traveller 54 such that at least one lateral sidewall 74 of the traveller 54 will interact with the stylus 80 inside sidewall 77 of the dock 56.

FIG. 7 furthermore shows the lip of the mouth 81 provided with the cam provision 85 for spinning the entering traveller 54 into one of the preferred orientations. The tone arm 78 is shown resting in its neutral position, as urged to hold still there by the spring 84.

FIG. 8 shows that the tone arm 78 can be deflected clockwise or counterclockwise (as shown in dashed lines), but the spring 84 serves to return the tone arm 78 to the neutral position as shown in solid lines after the removal of the deflecting force (none is shown).

FIG. 9 shows the traveller 54 entering the mouth 81 of the dock 56. The stylus 80 of the tone arm 78 is still yet in the neutral position and has just passed into the opening channel 94 of the asymmetrical heart-shaped groove 75 in a sidewall 74 of the traveller 54.

FIG. 10 shows that the traveller 54 has been forced to reach its further extreme outboard travel inside the dock 56. The traveller 54 has limited out in the dock 56. The cause of the forcing of the traveller 54 to limit out is, needless to say, the user hand-lining the halyard 38. The stylus 80 has traced the groove 75 around the relatively more diminutive lobe of the asymmetrical heart-shaped groove 75. However, the loop around the relatively more diminutive lobe—the inbound loop 87—is the relatively longer loop.

FIG. 11 shows what happens when the user releases the halyard 38. The traveller 54 wants to naturally pull out of the dock 56. That is, the tension on the fishing line 33 from the beam 42 of the boat 31 to the trolling lure wants to pull the conjoined release clip 35 back to the beam 42 of the boat 31. However, while the traveller 54 has sprung back a little bit from the extreme position shown in FIG. 10, the stylus 80 is caught in the cleavage 88 of the asymmetrical heart-shaped groove 75, between the two lobes, and the traveller 54 is stuck there also.

FIG. 12 shows how the user retrieves the conjoined release clip 35 and traveller 54. The user initially pulls the return run 46 of the halyard 38 to consequentially pull the traveller 54 back toward the position shown in FIG. 10 in the direction of outboard-bound arrow 92. This in further consequence has sent the stylus 80 tracing the outbound loop 89 around the relatively larger lobe. At this stage, the traveller 54 is free to depart the dock 56 in the direction of inboard-bound arrow 93.

FIG. 13 shows the traveller 54 in the stage of exiting the dock 56 and wherein the stylus 80 is about to be left behind by the traveller 54 and pass through the opening channel 94 in the asymmetrical heart-shaped groove 75.

FIG. 14 shows that indeed the traveller 54 has departed from the dock 56, and the stylus 80 has returned to the neutral position.

FIG. 15 shows an alternate polygonal geometry shared between the traveller 54 and the dock 56 to ensure that at least one flat sidewall 74 of the traveller 54 interacts with a coplanar inside sidewall 77 of the dock 56 that is furnished with the tone arm 78 and stylus 80. The dock 56 includes a cam provision 85 on the lip of the mouth 81 to spin the traveller 54 into any one of the equally preferred orientations.

Figure 16:
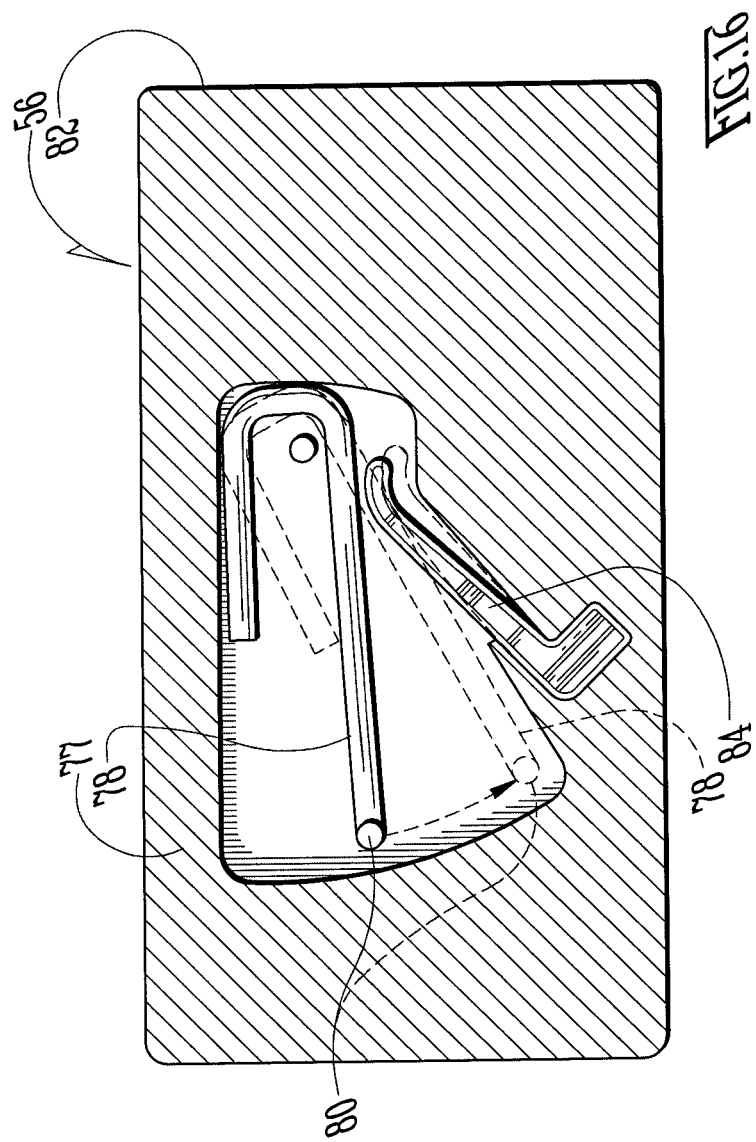
FIG. 16 is a section view taken along line XVI-XVI in FIG. 15.

FIG. 16 shows an alternate biasing provision 84 for biasing the tone arm 78 into the neutral position after being deflected either clockwise or counterclockwise away.

Figure 17:
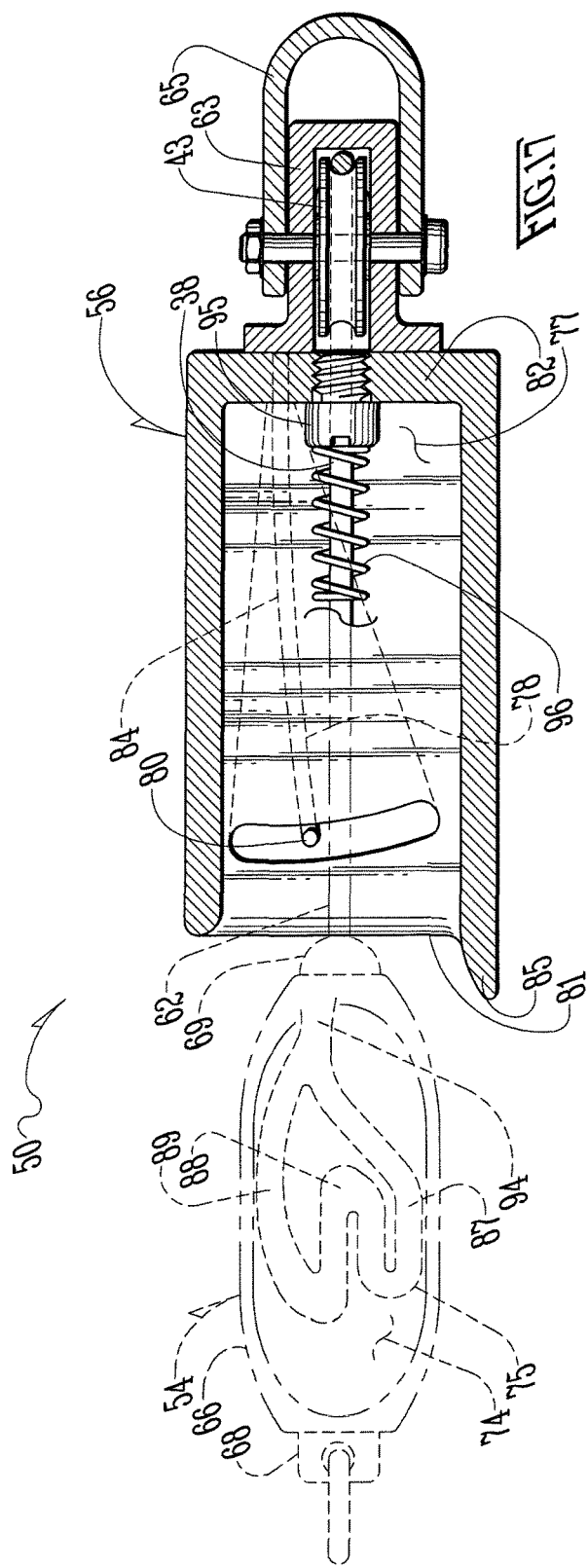
FIG. 17 is a section view taken along line XVII-XVII in FIG. 15.

FIG. 17 shows an alternate provision for keeping the stylus 80 jammed in the cleavage 88 (as shown in FIG. 11). The alternate provision shown here is a coil compression spring 96.

FIG. 18 shows another geometry shared between the traveller 54 and the dock 56 to ensure that the one flat sidewall 74 of the traveller 54 with the heart-shaped groove 75 interacts with the coplanar inside sidewall 77 of the dock 56 that is furnished with the tone arm 78 and stylus 80. The dock 56 includes a cam provision 85 on the lip of the mouth 81 to spin the traveller 54 into the single one preferred orientation.

FIG. 19 shows one way of connecting the distal tag end 62 of the halyard 38 to the traveller 54, in fact, this being one non-limiting way to have a loop halyard 38 attached to the traveller 68.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A remotely operable latch system for an endless halyard, comprising:
    a traveller comprising an elongated body that extends between a nose and a tail;
    a tubular hollow dock elongated between a back end and an open mouth for receiving the traveller by the nose and thereafter the tubular hollow dock latching onto the traveller;
    a fishing-line release provision conjoined to the traveller;
    proximal tackle adapted to be mounted to a boat;
    distal tackle conjoined with the dock adapted to be mounted at or near a tip of an outrigger spar; and
    an elongated halyard having a distal end associated with the nose of the traveller, a proximal end associated with the fishing-line release provision, and extended between passing distally around the distal tackle and passing proximally around the proximal tackle;
    wherein said traveller has a sidewall formed with a groove and said dock has an inside sidewall provided with a stylus for tracing the groove in the traveller;
    said groove forming a circuit comprising an inbound opening, cleavage, an inbound loop extending between the inbound opening and the cleavage, an outbound opening, and an outbound loop extending between the cleavage and the outbound opening;
    whereby the traveller latches in the dock when the stylus is caught in the cleavage of the groove.

2. The remotely operable latch system of claim 1, wherein:
    the inbound loop and outbound loop not only merge proximate the cleavage but also merge again such that the inbound opening and the outbound opening are a common opening.

3. The remotely operable latch system of claim 2, wherein:
    the groove is one of an irregular heart shape or heart-shaped.

4. The remotely operable latch system of claim 1, wherein:
    the stylus is biased to assume a neutral position which corresponds to an axis extending through the inbound opening of the groove in the traveler; and
    the stylus can be deflected positively and negatively away from the neutral position.

5. The remotely operable latch system of claim 4, further comprising:
    an elongated tone arm for extending between a base end and the stylus;
    wherein the elongated tone arm is biased or else comprises the bias force that has the stylus assume the neutral position.

6. The remotely operable latch system of claim 1, wherein:
the traveller and dock are proportioned such that, when the stylus is caught in the cleavage of the groove, the nose of the traveller is spaced away from the back end of the dock;
whereby a user can handline the halyard to separate the stylus from the cleavage and whereby the outbound loop is configured relative the cleavage such that the stylus launches into the outbound loop.

7. The remotely operable latch system of claim 6, wherein:
the halyard is biased to urge the stylus to stay caught in the cleavage.

8. The remotely operable latch system of claim wherein:
the halyard is biased by pull of a trolling lure on the fishing-line release provision.

9. The remotely operable latch system of claim 1, wherein:
the traveller has at least one sidewall which is formed with the groove; and
the dock has at least one inside sidewall associated with the stylus;
said traveller and dock having cooperative provisions to spin the dock and/or traveller relative to each other such that the at least one sidewall of the traveller travels past the at least one inside sidewall of the dock associated with the stylus and thereby the stylus engaging with the groove.

10. The remotely operable latch system of claim 9, wherein:
the traveller comprises triangular body with a bulbous nose;
the dock comprises a triangular tubular form corresponding in size for receiving the triangular body of the traveller and providing the mouth with three lips; and
the dock further comprising at least one cam projection associated with at least one lip whereby to spin the dock and/or traveller relative to each other such that at least one sidewall of the traveller travels past the at least one inside sidewall of the dock associated with the stylus.

11. The remotely operable latch system of claim 10, wherein:
said triangular body of the traveller is composed of three flat sidewalls; and
said groove is repeated in each of the three flat sidewalls.

12. The remotely operable latch system of claim 1, wherein:
the proximal tackle comprises any of a pulley or a handrail.

13. A remotely operable latch system for an endless halyard, comprising:
a traveller comprising an elongated body that extends between a nose and a tail;
a tubular hollow dock elongated between a back end and an open mouth for receiving the traveller by the nose and thereafter the tubular hollow dock and traveller latching together;
a fishing-line release provision conjoined to the traveller;
proximal tackle adapted to be mounted to a boat;
distal tackle conjoined with the dock adapted to be mounted at or near a tip of an outrigger spar; and
an elongated halyard having a distal end associated with the nose of the traveller, a proximal end associated with the fishing-line release provision, and extended between passing distally around the distal tackle and passing proximally around the proximal tackle;
wherein said traveller has a sidewall and said dock has an inside sidewall, one of which sidewall of the traveller or inside sidewall of the dock is formed with a groove;
the other of the inside sidewall of the dock or sidewall of the traveller is provided with a stylus for tracing the groove in the one of said sidewall of the traveller or inside sidewall of the dock that is formed with the groove;
said groove forming a circuit comprising an inbound opening, cleavage, an inbound loop extending between the inbound opening and the cleavage, an outbound opening, and an outbound loop extending between the cleavage and the outbound opening;
whereby the traveller latches in the dock when the stylus is caught in the cleavage of the groove.

14. The remotely operable latch system of claim 13, wherein:
the inbound loop and outbound loop not only merge proximate the cleavage but also merge again such that the inbound opening and the outbound opening are a common opening; and
the groove is one of an irregular heart shape or heart-shaped.

15. The remotely operable latch system of claim 13, wherein:
the stylus is biased to assume a neutral position which corresponds to an axis extending through the inbound opening of the groove in the traveler; and
the stylus can be deflected positively and negatively away from the neutral position.

16. The remotely operable latch system of claim 13, wherein:
the traveller and dock are proportioned such that, when the stylus is caught in the cleavage of the groove, the nose of the traveller is spaced away from the back end of the dock; and
the halyard is biased to urge the stylus to stay caught in the cleavage;
whereby a user can handline the halyard to separate the stylus from the cleavage and whereby the outbound loop is configured relative the cleavage such that the stylus launches into the outbound loop.

17. The remotely operable latch system of claim 13, wherein:
said traveller and dock having cooperative provisions to spin the dock and/or traveller relative to each other such that the sidewall of the traveller travels past the inside sidewall of the dock thereby cooperatively aligning the traveller and dock such that the stylus engages with the groove.

18. The remotely operable latch system of claim 13, wherein:
the proximal tackle comprises any of a pulley or a handrail.

* * * * *